United States Patent Office 2,756,029
Patented July 24, 1956

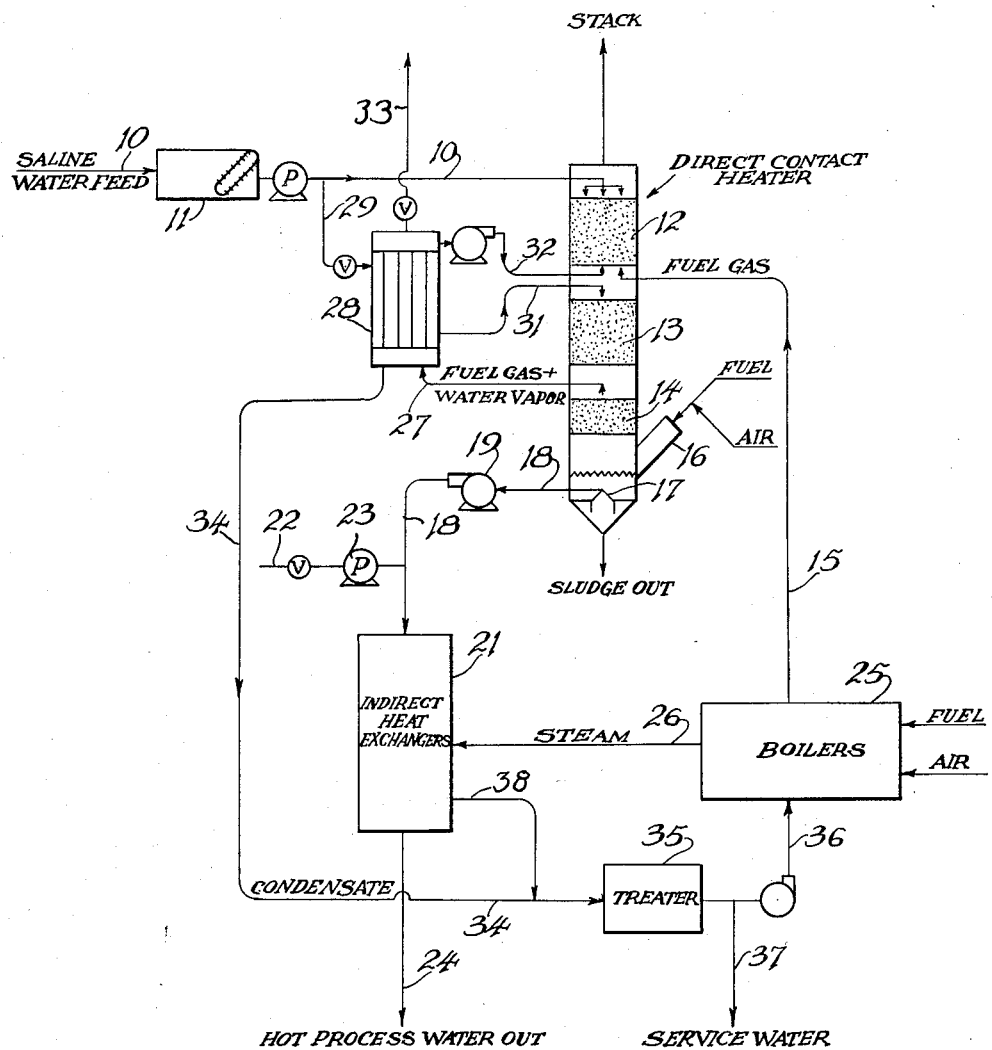

2,756,029

HEATING SYSTEMS FOR WATER CONTAINING DISSOLVED SCALE-FORMING SOLIDS

Vas Hubert Brogdon, Port Sulphur, La., assignor to Freeport Sulphur Company, New York, N. Y., a corporation of Delaware Application February 19, 1952, Serial No. 272,410

11 Claims. (Cl. 257—51)

This invention relates to heating systems capable of providing hot saline and other waters in large volume for process purposes but at the same time requiring a lesser quantity of fresh or purer water for boilers, service or other purposes. Examples of such heating systems and processes are described in the copending applications of Bernard A. Axelrad and Vas Hubert Brogdon filed September 1, 1951, Serial Number 244,854, now abandoned, and Serial No. 253,306, filed October 26, 1951.

In such applications, it is proposed to heat salt water and other water containing scale-forming solids to temperatures above the normal boiling point in pressurized direct heaters employing flame or combustion gases and proposed to heat such water to intermediate temperatures in direct heaters operated substantially at atmospheric pressures followed by heating in indirect tube exchangers under pressure in which steam is employed as the heating medium. In these and similar processes, some fresher water or non-scaling water is generally required for boiler feed and service purposes as for operating pumps, air-compressors and other equipment. In such processes the salt or other water containing the scale-forming solids is utilized as process water for the reason that fresh or non-corrosive water is not available at all or is not economically obtainable. Under such conditions, purer water also may not be available for the stated auxiliary purposes.

An object of the present invention is to provide boiler feedwater, fresh service water and other like water where natural fresh water suitable for such purposes is not available, in connection with operations wherein large volumes of saline or scale-forming process water are to be heated to temperatures at an elevation ordinarily causing scale deposition when the water comes in contact with metal surfaces, as in ordinary steam boiler tubes.

Another object is to provide a process for securing such boiler feed and other fresh water at high thermal efficiency. Another object is to reduce the cost of operating steam boilers in conjunction with processes employing large quantities of hot process water. A further object is to avoid the high cost of the usual evaporation processes which heretofore would have been considered necessary in such operation.

Yet another object is to provide water suitable for boiler feed and service purposes from a raw water supply which is scale-forming, corrosive or brackish in character by procedures which substantially overcome the problems which scale formation causes.

Broadly considered the invention may be described as relating to heating systems in which large quantities of hot process water containing dissolved scale-forming solids are produced and lesser quantities of water for boiler, service or other purposes are needed, and as involving (1) the flowing of impure or scale-forming water into and through a direct gas contact heating zone, (2) the introduction of hot combustion gases into said heating zone and into direct contact with the water to be heated whereby the water becomes heated and the gases take up moisture, and (3) the flowing of the moisture-laden gases so produced while still hot from said heating zone and into a heat exchanger zone in indirect contact with the cool impure water flowing to the direct heating zone wherein the moisture of the gases separates as condensate. Through such procedure the scale-forming water flowing from the direct heating zone becomes heated and a condensate of fresher water freed of the scale-forming solids flows from the direct heat exchanger zone.

The preferred specific features of the present invention may be readily understood from the embodiment of the invention illustrated in the accompanying schematic flow sheet drawing.

Saline water or other raw water containing scale-forming solids dissolved therein after being collected by a suitable system of pumps and screens and settled in a reservoir for the removal of heavy silt is pumped through an inlet pipe 10 into a screen box 11 into the top of a direct contact heater or tower as shown. This heater is preferably provided with superimposed spaced layers of contact material 12, 13 and 14 composed of ceramic rings, coke or other conventional surface extending substances. The water sprayed into the top of the tower is first heated by waste flue gases introduced into the tower through pipe 15 and is then raised to a higher temperature by combustion gases produced in or introduced into the tower from the chamber 16. These gases are preferably produced from exactly proportioned air and fuel to provide carbon dioxide gases devoid of free oxygen or excess air components. The heated water descends to the bottom of the tower wherein a settling pool is formed and from which any algae and other colloidal matter present settles out below the cone 17. The indirect contact heater is operated substantially at atmospheric pressure and the saline water is heated therein to a temperature above 140° and preferably of from 150° to 195° F.

The thus heated water leaving the tower at a point above the bottom flows out through the conduit 18 to the pressure raising pump 19 and thence to the indirect heat exchanger 21. In transit, an addition of a scale-inhibiting agent may be introduced into the line 18 at any suitable point as through the inlet conduit 22 with the assistance of pump 23. The hot water flows from the heat exchanger 21 through the outlet conduit 24 to the process or operation utilizing the same.

The steam for the indirect heat exchanger 21 is provided by the boiler 25 from which it flows through the conduit 26 to heat exchanger 21.

In accordance with a primary feature and preferred embodiment of the present invention, the boiler feed water and service water are obtained by withdrawing part of the combustion gases, which quickly become saturated with moisture, from an intermediate level in the direct heating zone or tower through the conduit 27 and introducing the same into an indirect heat exchanger or condenser 28 wherein the cooling is effected by means of raw feed water flowing from the inlet conduit 10 through the branch conduit 29. The said cooling water after flowing through the condenser 28 flows to the heating tower through the conduit 31 preferably connected at an intermediate point, whereby the heat taken up from the gases is, for the most part, returned to the tower.

The condenser water returned to the direct heating zone is advantageously introduced at a point where the saline water is at substantially the same temperature as that of the condenser water and preferably not introduced into the tower at a point where the saline water flowing therethrough is colder than the condenser water.

After having given up their moisture content in the condenser 28 the partially cooled flue gases are preferably returned to the upper portion of the tower through conduit 32 connected at an intermediate level, wherein the remaining heat values therein are given up to the cooler saline water flowing therethrough.

The production of fresh water in the condenser 28 is most efficiently accomplished when the moisture-laden combustion gases are removed from the tower as soon as they become saturated or at as high a temperature as possible and wherein the said gases and saline water in the condenser are so proportioned that the temperature on the water side surfaces of the condenser tubes is below that causing scaling in the tubes.

In a less important mode of operation of the condenser 28, the moisture-laden gas and the saline water are employed in such amounts that the gases give up substantially all of their sensible heat to the saline water in which case the spent gases instead of being returned to the tower through the conduit 32 are discharged to the atmosphere through the conduit 33.

The condensate obtained in the heat exchanger 28 flows through the conduit 34 through a water purifying apparatus or treater 35 wherein the dissolved impurities in the condensate may be removed. The treatment may involve degasification as well as suitable chemical treatment such as adding an alkali or phosphate to adjust the hydrogen ion concentration to take care of sulfur impurities. If spray removal is inadequate, the water may be treated by ion exchange for removal of impurities or the water may be filtered if excess soot is present.

The thus purified water is then in a condition for utilization in the boilers 25 and for utilization for various other purposes, the flow to the boiler being provided for by conduit 36 and to service purposes through the conduit 37. Any condensate obtained in the indirect heat exchanger 21 may be returned to the boiler through conduit 38 connecting into the conduit 34 leading to the treater 35.

In the operation of the direct contact heater at atmospheric pressure, the moisture-laden combustion gases are flowed from the direct contact heater at a temperature at least about 50° F. above the temperature of the raw saline feed water or above about 100–125° F. in order to obtain practical or adequate efficiency. For better results, the moisture-laden gases should be withdrawn at a temperature in excess of 150° F.

The fresh water production procedure of the present invention may be operated in conjunction with a pressurized direct contact heater and such procedure is within the scope of the invention as broadly claimed herein.

The direct heater or tower may alternatively be equipped simply as a spray contact tower without packing or it may be of a bubble cap type. Also the base of the tower may be so constructed as to provide for submerged combustion at the base thereof. The heating of the saline water can be carried out in two or in three towers instead of in one, if economic or expedient considerations so require.

In the embodiment illustrated in the drawing only part of the combustion gases are removed and flowed through the condenser, the remaining part being permitted to flow upwardly through the tower and out of the top to the stack. Within the broader concepts of the invention all of the combustion gases can be flowed through the condenser 28 but only with loss in efficiency. Furthermore, instead of flowing part of the saline feed water directly to the tower and part through the condenser 28 all of such water can be flowed through the condenser, but again with loss of efficiency. If these procedures are followed the condenser may be mounted directly on top of the tower.

The process of the invention is applicable to the utilization of many types of natural and waste waters containing scale-forming salts in objectionable quantities. Among them are saline waters of all kinds, including sea, lake, marsh, swamp and river waters.

It should be understood that this invention is not limited to the specific procedures of conditions herein disclosed but that it extends to all equivalents which will occur to those skilled in the art upon consideration of the claims appended hereto. The temperatures specified in the claims are in degrees Fahrenheit and the "unpure water" referred to therein defines saline or other water containing scale-forming solids in contrast with the "purer water" produced by the process for boiler use.

That which is claimed is:

1. In heating systems for providing large quantities of water containing dissolved scale-forming solids, and requiring lesser quantities of purer water for boiler, service or other purposes the process which comprises flowing the unpure water into and through a direct gas contact heating zone, introducing hot combustion gases into said heating zone and into direct contact with the water to be heated whereby the water becomes heated without boiling and the gases take up moisture, flowing moisture-laden gases so produced while still hot from said heating zone and into a heat exchanger zone in indirect contact with unpure water flowing to the direct heating zone wherein the moisture is condensed, thereby providing the hot unpure water flowing from the direct heating zone and a condensate freed of the dissolved solids from the indirect heat exchanger zone.

2. In heating systems for providing large quantities of water containing dissolved scale-forming solids, and requiring lesser quantities of purer water for boiler, service or other purposes the process which comprises flowing the unpure water into and through a direct gas contact heating zone, introducing hot combustion gases into said heating zone and into direct contact with the water to be heated whereby the water becomes heated without boiling and the gases take up moisture, flowing part of the moisture-laden gases so produced while at a temperature in excess of about 150° from said heating zone and into a heat exchanger zone in indirect contact with unpure water flowing to the direct heating zone wherein the moisture is condensed, contacting the remaining part of the hot gases with cooler water flowing through the said direct heating zone whereby remaining heat values are given up to said water, thereby providing the hot unpure water flowing from the direct heating zone and a condensate freed of the dissolved solids from the indirect heat exchanger zone.

3. In heating systems for providing large quantities of water containing dissolved scale-forming solids, and requiring lesser quantities of purer water for boiler, service or other purposes the process which comprises flowing the unpure water into and through a direct gas contact heating zone, introducing hot combustion gases into said heating zone and into direct contact with the water to be heated whereby the water becomes heated without boiling and the gases take up moisture, flowing part of the moisture-laden gases so produced quickly after they have become saturated with the moisture from said heating zone and into a heat exchanger zone in indirect contact with part of the unpure water flowing to the direct heating zone, wherein the moisture is condensed, contacting the remaining part of the hot gases with cooler water flowing through the said direct heating zone whereby remaining heat values are given up to said water, thereby providing the hot unpure water flowing from the direct heating zone and a condensate freed of the dissolved solids from the indirect heat exchanger zone.

4. In heating systems for providing large quantities of water containing dissolved scale-forming solids, and requiring lesser quantities of purer water for boiler, service or other purposes the process which comprises flowing the unpure water into and through a direct gas contact heating zone, introducing hot combustion gases into said heating zone and into direct contact with the water to be heated whereby the water becomes heated without boiling and the gases take up moisture, flowing moisture-laden gases so produced while still hot from said heating zone and into a heat exchanger zone in indirect contact with unpure water flowing to the direct heating zone wherein the moisture is condensed, flowing the gases from which the moisture has been condensed but which still contain values back into said direct heating zone and into contact with cooler water flowing therethrough.

5. In heating systems for providing large quantities of water containing dissolved scale-forming solids, and requiring lesser quantities of purer water for boiler, service or other purposes the process which comprises flowing the unpure water into and through a direct gas contact heating zone, introducing hot combustion gases into said heating zone and into direct contact with the water to be heated whereby the water becomes heated without boiling and the gases take up moisture, flowing part of the moisture-laden gases so produced while at a temperature in excess of about 150° from said heating zone and into a heat exchanger zone in indirect contact with unpure water flowing to the direct heating zone wherein the moisture is condensed, contacting the remaining part of the hot gases with cooler water flowing through the said direct heating zone whereby remaining heat values are given up to said water, flowing the gases from which the moisture has been condensed but which still contain heat values back into said direct heating zone and into contact with cooler water flowing therethrough.

6. In heating systems for providing large quantities of water containing dissolved scale-forming solids, and requiring lesser quantities of purer water for boiler, service or other purposes the process which comprises flowing the unpure water into and through a direct gas contact heating zone, introducing hot combustion gases into said heating zone and into direct contact with the water to be heated whereby the water becomes heated without boiling and the gases take up moisture, flowing part of the moisture laden gases so produced quickly after they have become saturated with the moisture from said heating zone and into a heat exchanger zone in indirect contact with part of the unpure water flowing to the direct heating zone wherein the moisture is condensed, contacting the remaining part of the hot gases with cooler water flowing through the said direct heating zone whereby remaining heat values are given up to said water, flowing the gases from which the moisture has been condensed but which still contain heat values back into said direct heating zone and into contact with cooler water flowing therethrough, thereby providing the hot unpure water flowing from the direct heating zone and a condensate freed of the dissolved solids from the indirect heat exchanger zone.

7. In heating systems for providing hot saline water in large quantities and requiring also a quantity of purer water for boiler, service or other like purposes the process which comprises flowing the saline water into and through a direct gas contact heating zone, introducing hot combustion gases into said heating zone and into direct contact with the water to be heated whereby the water becomes heated without boiling and the gases take up moisture, flowing only part of the moisture-laden gases so produced while at a temperature in excess of about 150° from said heating zone and into a heat exchanger zone in indirect contact with saline water flowing to the direct heating zone wherein a condensate of purer water is formed, proportioning the saline water and the gases introduced into said heat exchanger zone such that the temperature therein is maintained below that at which excessive scale deposition occurs.

8. In heating systems for providing large quantities of water containing dissolved scale-forming solids, and requiring lesser quantities of purer water for boiler, service or other purposes the process which comprises introducing the impure water into a direct gas contact heating zone at a higher level thereof and flowing the same downwardly therethrough, introducing hot combustion gases at a lower level in said zone and flowing the same upwardly therein in contact with the water to be heated whereby the water becomes heated without boiling and the gases take up moisture, withdrawing only a portion of the moisture-laden gases so produced at a temperature in excess of about 150° from an intermediate level in said zone, flowing said withdrawn gases into and through a heat exchanger zone in indirect contact with unpure water flowing to the direct heating zone, wherein the moisture is condensed, thereby providing the hot unpure water flowing from the direct heating zone and a condensate freed of the dissolved solids from the indirect heat exchanger zone.

9. In heating systems for providing superheated saline water the process which comprises flowing the saline water into and through a direct gas contact heating zone operated substantially at atmospheric pressure, introducing hot combustion gases into said heating zone and into direct contact with the water to be heated whereby the water becomes heated to a temperature above about 140° up to about 195° and the gases take up moisture, flowing moisture-laden gases so produced while still hot from said heating zone and into a heat exchanger zone in indirect contact with saline water flowing to the direct heating zone wherein the moisture is condensed, thereby providing the hot saline water flowing from the direct heating zone and a condensate freed of the dissolved solids from the indirect heat exchanger zone, flowing the obtained hot saline water under superatmospheric pressure through the heating tubes of a heat exchanger, converting said condensate to steam and utilizing said steam in said heat exchanger to heat the saline water.

10. In heating systems for providing superheated saline water, the process which comprises flowing the saline water into and through a direct gas contact heating zone operated substantially at atmospheric pressure, introducing hot combustion gases into said heating zone and into direct contact with the water to be heated whereby the water becomes heated without boiling to a temperature above about 140° and the gases take up moisture, flowing part of the moisture-laden gases so produced quickly after they have become saturated with the moisture from said heating zone and into a heat exchanger zone in indirect contact with part of the saline water flowing to the direct heating zone wherein the moisture is condensed, contacting the remaining part of the hot gases with cooler water flowing through the said direct heating zone whereby remaining heat values are given up to said water, thereby providing the hot saline water flowing from the direct heating zone and a condensate freed of the dissolved solids from the indirect heat exchanger zone, flowing the obtained hot saline water under superatmospheric pressure through the heating tubes of a heat exchanger, converting said condensate to steam and utilizing said steam in said heat exchanger to heat the saline water.

11. In heating systems for providing superheated saline water, the process which comprises flowing the saline water into and through a direct gas contact heating zone operated substantially at superatmospheric pressure, introducing hot combustion gases into said heating zone and into direct contact with the water to be heated whereby the water becomes heated without boiling to a temperature above about 140° and the gases take up moisture, flowing part of the moisture-laden gases so produced quickly after they have become saturated with the moisture from said heating zone and into a heat exchanger zone in indirect contact with part of the saline water flowing to the direct heating zone wherein the moisture is condensed, contacting the remaining part of the hot gases with cooler water flowing through the said direct heating zone whereby remaining heat values are given up to said water, flowing the gases from which the moisture has been condensed but which still contains heat values back into said direct heating zone and into contact with cooler water flowing therethrough, thereby providing the hot saline water flowing from the direct heating zone and a condensate freed of the dissolved solids from the indirect heat exchanger zone.

References Cited in the file of this patent

UNITED STATES PATENTS

| | | |
|---|---|---|
| 884,223 | Shipley | Apr. 7, 1908 |
| 980,108 | Lillie | Dec. 27, 1910 |
| 1,204,614 | Harris et al. | Nov. 7, 1916 |
| 1,432,521 | Balcke | Oct. 17, 1922 |
| 1,651,557 | Senseman | Dec. 6, 1927 |
| 2,066,348 | Hays | Jan. 5, 1937 |
| 2,095,578 | Theiler | Oct. 12, 1937 |
| 2,344,839 | Warburton | Mar. 21, 1944 |
| 2,394,643 | Switzer | Feb. 12, 1946 |

FOREIGN PATENTS

| | | |
|---|---|---|
| 658,286 | Great Britain | Oct. 3, 1951 |